United States Patent [19]

Hosaka

[11] Patent Number: 4,727,432
[45] Date of Patent: Feb. 23, 1988

[54] A VDP TIMING SIGNAL GENERATOR PRODUCING CLOCK SIGNALS IN PHASE WITH PRODUCED VIDEO SYNC SIGNALS AND DISPLAYING THE INPHASE CONDITION

[75] Inventor: Sumio Hosaka, Saitama, Japan

[73] Assignee: Pioneer Electronic Corporation, Tokyo, Japan

[21] Appl. No.: 717,770

[22] Filed: Mar. 29, 1985

[30] Foreign Application Priority Data

Mar. 30, 1984 [JP] Japan ................. 59-62622

[51] Int. Cl.$^4$ .................... H04N 5/06; H04N 5/84
[52] U.S. Cl. ................... 358/342; 358/343; 358/341; 358/319; 358/148; 360/35.1
[58] Field of Search ........... 358/312, 319, 320, 323, 358/337, 341, 342, 343, 150, 149, 153, 148, 140, 339; 369/47, 48, 53, 54; 365/234; 360/10.1, 19.1, 35.1

[56] References Cited

U.S. PATENT DOCUMENTS

| | | | |
|---|---|---|---|
| 3,908,080 | 9/1975 | Broadbent | 358/343 |
| 3,909,512 | 9/1975 | Omori et al. | 358/343 |
| 4,065,794 | 12/1977 | Shutterly | 360/35.1 |
| 4,165,524 | 8/1979 | Ninomiya | 358/339 |
| 4,426,661 | 1/1984 | Okada et al. | 358/140 |
| 4,543,614 | 9/1985 | Chen | 358/153 |
| 4,583,131 | 4/1986 | Dakin | 358/342 |
| 4,613,827 | 9/1986 | Takamori et al. | 358/319 |
| 4,665,437 | 5/1987 | Nicholson | 358/148 |

*Primary Examiner*—Raymond F. Cardillo
*Assistant Examiner*—Robert A. Weinhardt
*Attorney, Agent, or Firm*—Sughrue, Mion, Zinn, Macpeak, and Seas

[57] ABSTRACT

A timing signal generator for use in a system reproducing video format signals such as a video disc player, the timing signals being used to control a still-with-sound (SWS) processor operating with the video disc player. The timing signal generator includes a synchronizing signal separator circuit for extracting the vertical and composite synchronizing signals from the reproduced video signal. The extracted vertical synchronizing signal is input to a phase-locked loop which produces a system clock synchronized to the vertical synchronizing signal. A horizontal synchronizing circuit receives the system clock signal and the composite synchronizing signal to produce a timing signal in phase with the system clock within the horizontal period. A vertical synchronizing circuit receives the extracted vertical synchronizing signal and the output of the horizontal synchronizing circuit to produce a timing signal synchronous with the system clock within the vertical period. A timing signal generating circuit produces timing signals for the SWS processor from the timing signals produced by the horizontal and vertical synchronizing circuits. In addition, a synchronous lock detecting circuit connected to a suitable display, produces signals indicating synchronism of the extracted vertical synchronizing signals with the timing signal produced by the vertical synchronizing circuit of the timing signal generator.

10 Claims, 1 Drawing Figure

A VDP TIMING SIGNAL GENERATOR PRODUCING CLOCK SIGNALS IN PHASE WITH PRODUCED VIDEO SYNC SIGNALS AND DISPLAYING THE INPHASE CONDITION

BACKGROUND OF THE INVENTION

The invention relates to a timing signal generator producing system timing signals from a reproduced video format signal.

In the field of reproducing video format signals there has recently been developed a Still-With-Sound (SWS) system. In such a system, digitial audio data is recorded together with video data and control data on a recording disc. During playback, the audio data along with the video data are played back in response to the control data so as to add sound background to a corresponding still video display. An SWS processor for reproducing and processing audio and control data (hereinafter collectively referred to as "SWS data") has been developed for use in conjunction with an ordinary Video Disc Player (VDP).

For the SWS processor to operate properly, the system clock signal controlling the SWS processor must be in phase with the reproduced video signal. It is also important for the operator of the SWS system processor, when operating it in the manual mode, to be aware of whether or not the system clock signal controlling the SWS processor is synchronous with the reproduced video signal.

SUMMARY OF THE INVENTION

It is an object of the invention to provide a timing signal generator by which it is readily determined whether an internal system clock signal is in phase with a reproduced video signal.

The timing signal generator according to the present invention produces a clock signal synchronous with a synchronizing signal contained in a reproduced video format signal. Various system timing signals are produced from the clock signals synchronous with a synchronizing signal of the reproduced video format signal. The timing signal generator includes a detection means for detecting whether the synchronizing signal contained in the reproduced video signal is synchronized with the system timing signals so that a user of the system in which the timing signal generator is incorporated, such as an SWS system, can ascertain whether or not the timing signals are synchronous with the reproduced video signal.

BRIEF DESCRIPTION OF THE DRAWINGS

The FIGURE illustrates a preferred embodiment of the timing signal generating circuit according to the teachings of the invention.

DETAILED DESCRIPTION OF THE DRAWINGS

Figure 1:
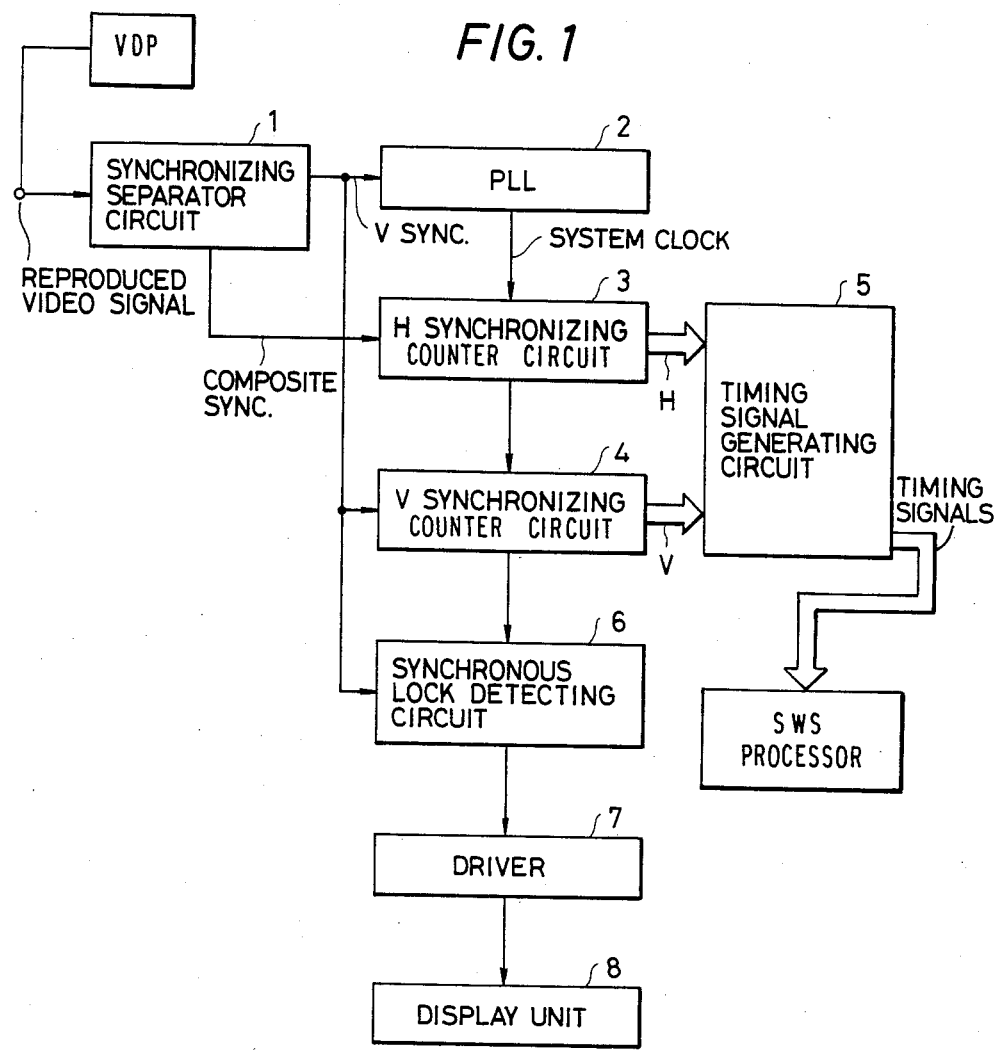

Referring to the FIGURE, the timing signal generating circuit of the present invention is constructed of a synchronizing signal separator circuit 1 receiving at its input a reproduced video format signal. The synchronizing signal separator circuit 1 produces two outputs, a vertical synchronizing signal and a composite synchronizing signal. The timing signal generator of the invention further includes a Phase-Locked Loop (PLL) 2 connected to receive the vertical synchronizing signal from the synchronizing separator circuit 1. The output of the PLL is connected as an input to a horizontal synchronizing circuit 3. The horizontal synchronizing circuit is connected to a timing signal generating circuit 5 and a vertical synchronzing circuit 4. The vertical synchronizing circuit is also connected to receive the vertical synchronizing signal from the synchronizing separator circuit 1. The vertical synchronizing circuit 4 is connected to the timing signal generating circuit 5 and to a synchronous lock detecting circuit 6 which also receives the vertical synchronizing signal from the synchronizing separator circuit 1. The output of the synchronous lock detecting circuit is connected to a driver 7, the output of which is connected to a display unit 8.

More specifically, a reproduced video signal from a VDP (not shown) is applied to the synchronizing separator circuit 1 which extracts the vertical synchronizing signal and the composite synchronizing signal from the reproduced video format signal. The vertical synchronizing signal is inputted to the PLL circuit 2 which produces a system clock signal in phase with the vertical synchronizing signal. This signal clock signal together with the composite synchronizing signal from the synchronizing separator circuit 1 are applied to a horizontal synchronizing circuit 3 which produces a timing signal in phase with the system clock signal within the horizontal period.

The horizontal synchronizing circuit 3 is preferably comprised of a counter circuit with the system clock signal being applied to the clock input of the counter. The composite synchronizing signal functions as a reset signal and is applied to the reset terminal of the counter. Assuming that the system clock signal output by the PLL circuit 2 has a frequency of 6.42 MHz and the counter of the horizontal synchronizing circuit counts the clock signal until it is reset each time the composite synchronizing signal is horizontally synchronized, the counter output will be phase locked with the horizontal synchronizing signal of the reproduced video format signal.

The output of the horizontal synchronizing circuit 3 and the vertical synchronizing signal from the synchronizing signal separator circuit 1 are applied to a vertical synchronizing circuit 4. The vertical synchronizing circuit produces a timing signal synchronous with the system clock signal within the vertical period. The vertical synchronizing circuit 4 is preferably comprised of a counter with the output of the horizontal synchronizing circuit 3 being applied as the clock input to the counter of the vertical synchronizing circuit. The vertical synchronizing signal functions as the reset signal and is applied to the reset terminal of the counter. The output of the counter in the vertical synchronizing circuit 4 is then in phase with the vertical synchronizing signal extracted from the reproduce video format signal. The outputs of both the horizontal synchronizing circuit 3 and the vertical synchronizing circuit 4 are applied to a timing signal generating circuit 5 to produce the various system timing signals within the SWS processor.

The synchronous lock detecting circuit 6, receiving as inputs the output of the vertical synchronizing circuit 4 and the vertical synchronizing signal from the synchronizing signal separator circuit 1, produces an output indicating synchronism of the vertical synchronizing signal from the synchronizing signal separator circuit 1 with the output of the vertical synchronizing circuit 4. The output of the synchronous lock detecting circuit 6 is applied to a lock display unit 8 through a driver 7.

With the timing signal generator herein described, the output signal of the horizontal and vertical synchronizing circuits 3, 4 are in phase with the reproduced video signal received by the synchronizing signal separator circuit 1. As the outputs of the synchronizing circuits 3, 4 are used to derive the system timing signals of the SWS processor, the various SWS processor system timing signals are synchronous with the reproduced video signal. Additionally, the system user is readily informed through the display unit 8 when the system timing signals have been synchronized with the reproduced video signal.

While any known lock detecting circuit may be used as the synchronous lock detecting circuit 6, it is possible to construct the lock detecting circuit 6 in such a manner that the vertical synchronizing signal from the synchronizing signal separator circuit 1 may be gated by the gate signal obtained from the output of the vertical synchronizing circuit 4. A signal indicating that synchronism has been established is produced when gate outputs are continuously obtained.

Still further, the display unit 8 may be replaced by an audio annunciator while the output of the synchronous lock detecting circuit 6 may be used in other systems.

With the timing signal generator of the invention, it is readily ascertained that system timing signals from an SWS to be added to a VDP are in phase with a reproduced video signals from the VDP. Thus, the user of the system need not send out a command signal to the VDP when the SWS processor operating in a manual mode is in a non-locked state.

I claim:

1. A timing signal generator for producing timing signals from a reproduced video format signal containing at least one synchronizing signal comprising:
means for generating a clock signal synchronous with a synchronizing signal contained in said reproduced video format signal, means for producing a timing signal synchronized to the synchronizing signal of said reproduced video format signal from said clock signal and said synchronizing signal contained in said reproduced video format signal, and detection means for indicating synchronism of said reproduced video format signal synchronizing signal with said timing signal.

2. The timing signal generator as claimed in claim 1, wherein said reproduced video format signal contains a plurality of synchronizing signals and said means for producing a timing signal includes means for producing first and second timing signals.

3. The timing signal generator as claimed in claim 2, wherein said means for producing first and second timing signals includes first synchronizing circuit means, responsive to a first synchronizing signal of said reproduced video format signal and said clock signal, for producing said first timing signal, and second synchronizing circuit means, responsive to a second synchronizing signal of said reproduced video format signal and said first timing signal, for producing said second timing signal.

4. The timing signal generator as claimed in claim 3, wherein said first synchronizing signal of said reproduced video format signal is the vertical synchronizing signal and said second synchronizing signal is the composite synchronizing signal.

5. The timing signal generator as claimed in claim 4, wherein said detection means includes a synchronous lock detecting circuit, responsive to said vertical synchronizing signal and said second timing signal, for producing a signal indicating synchronism of the vertical synchronizing signal with the second timing signal.

6. The timing signal generator as claimed in claim 5, further indicating display means for displaying a signal indicating synchronism of the vertical synchronizing signal with the second timing signal.

7. The timing signal generator as claimed in claim 5, further including audio annunicator means for audibly signaling synchronism of the vertical synchronizing signal with the second timing signal.

8. The timing signal generator as claimed in claim 5, further including synchronizing signal separator circuit means for extracting the vertical and composite synchronizing signals from a reproduced video format signal, and wherein said means of generating a clock signal comprises a phase-locked loop.

9. The timing signal generator as claimed in claim 8, further including timing signal generator circuit means for generating additional timing signals from said first and second timing signals.

10. The timing signal generator as claimed in claim 9, further including a still-with-sound processor responsive to the additional timing signal from said timing signal generator circuit means, and a video disc player for providing said reproduced video format signal.

* * * * *